United States Patent [19]

Kopse

[11] 4,269,360
[45] May 26, 1981

[54] FUEL INJECTION NOZZLE

[75] Inventor: Odon Kopse, Stuttgart, Fed. Rep. of Germany

[73] Assignee: Robert Bosch GmbH, Stuttgart, Fed. Rep. of Germany

[21] Appl. No.: 886,319

[22] Filed: Mar. 13, 1978

[30] Foreign Application Priority Data

Mar. 18, 1977 [DE] Fed. Rep. of Germany ....... 2711902

[51] Int. Cl.³ ............................................. F02M 47/02
[52] U.S. Cl. ................................................. 239/533.8
[58] Field of Search ........................... 239/533.3–533.9

[56] References Cited

U.S. PATENT DOCUMENTS

| 2,003,814 | 6/1935 | Taylor | 239/533.7 |
| 2,898,051 | 8/1959 | Teichert | 239/533.5 |
| 3,442,451 | 5/1969 | De Nagel | 239/533.5 X |
| 3,612,407 | 10/1971 | Itano | 239/533.4 |

FOREIGN PATENT DOCUMENTS

| 487403 | 10/1952 | Canada | 239/533.8 |
| 2014215 | 10/1971 | Fed. Rep. of Germany | 239/533.3 |
| 1242368 | 8/1960 | France | 239/533.8 |

Primary Examiner—Andres Kashnikow
Attorney, Agent, or Firm—Edwin E. Greigg

[57] ABSTRACT

The invention relates to a fuel injection nozzle for internal combustion engines provided with a nozzle body and having an axially guided radially sealed valve needle as well as an adjusting piston for cooperation with said valve needle.

4 Claims, 2 Drawing Figures

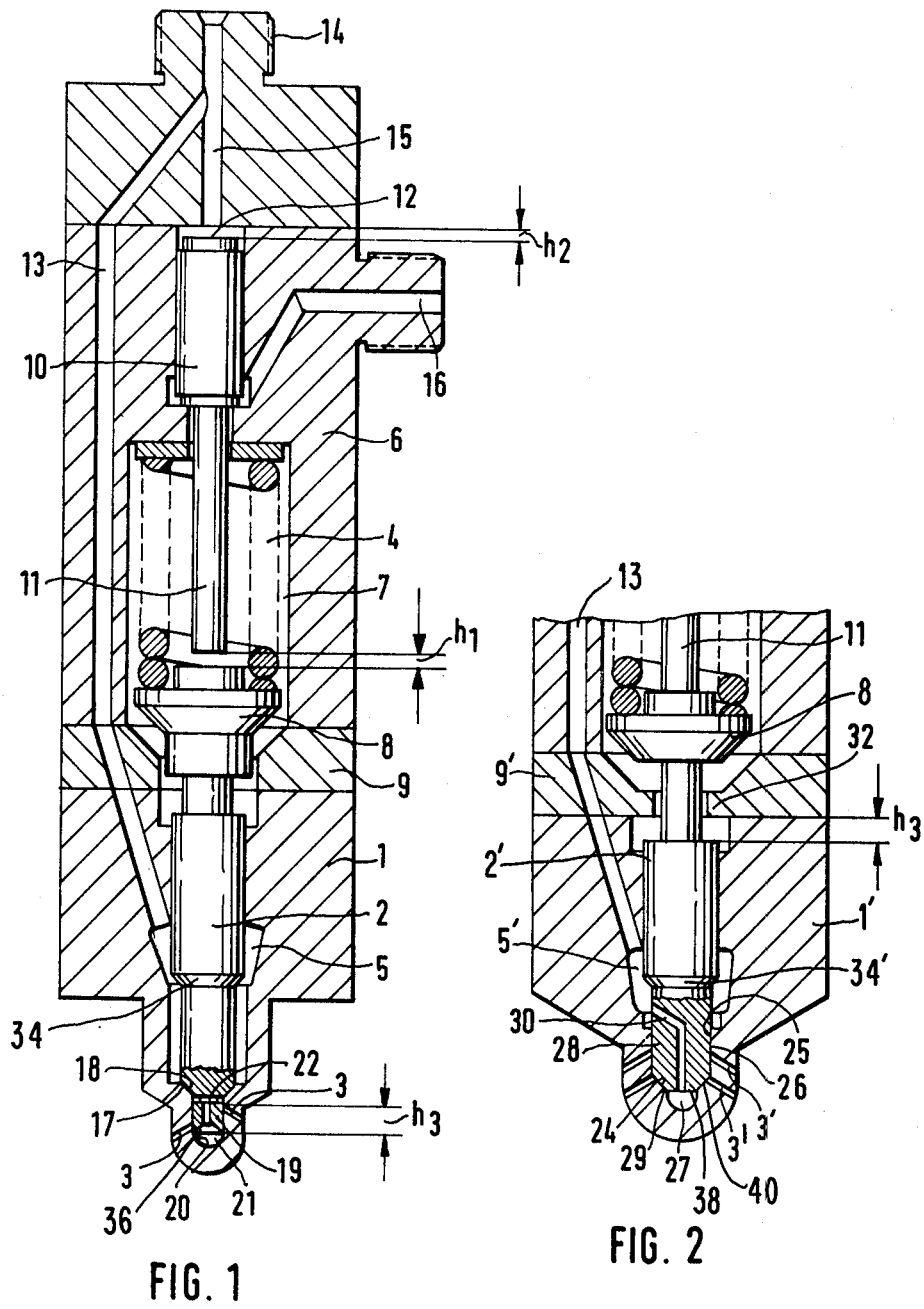

FUEL INJECTION NOZZLE

BACKGROUND OF THE INVENTION

The invention relates to a fuel injection nozzle for internal combustion engines provided with a valve needle that opens against a closing spring with the valve needle being loaded in its closing direction by an additional force that is supplied by means of an adjusting piston which is influenced by the delivered fuel. In a known fuel injection nozzle of this type, a pin that is arranged on the valve needle projects into an injection opening so that the injection cross section does not change despite a stroke of the valve needle that is dependent upon a delivery rate. In many engines, and especially in direct injection engines, however, it is advantageous when an enlargement of the injection cross section takes place during the transition from idling to full-load, and that the injection direction is also altered.

OBJECT AND SUMMARY OF THE INVENTION

The fuel injection nozzle according to the present invention has the advantage that the smoothness of running of the internal combustion engine is improved because of an injection cross section that enlarges under an increasing delivery rate of fuel, especially in the transitional rpm range between idling and full-load, as well as an improvement of the fuel consumption, the exhaust gases produced, and the overall performance of the internal combustion engine.

Still another advantageous development of the invention is that the valve needle has a cylindrical section, which is arranged to be radially guided in a blind bore of the nozzle body, and adapted to open separate series of injection openings, which are successively arranged in the nozzle body, during the stroke of the needle. By selecting the location and the cross section of these injection openings, both the direction of the injection cone and the order of opening of the injection openings, which order is dependent on the delivery rate, are relatively easily adapted to the most varied engine requirements. Because the injection openings are covered by the cylindrical section of the valve needle when the valve is closed, the "detrimental volume" connected with the combustion chamber in the fuel injection periods is reduced to a minimum, which has the effect of reducing the harmful hydrocarbons in the exhaust gas.

The invention will be better understood as well as further objects and advantages thereof become more apparent from the ensuing detailed description of two preferred embodiments taken in conjunction with the drawing.

BRIEF DESCRIPTION OF THE DRAWING

FIG. 1 shows generally in cross section an injection nozzle with the valve seat upstream of a control pin; and FIG. 2 shows a fragmentary cross-sectional view of the second exemplary embodiment of the invention with injection opening controls on the valve needle shaft as well as continual abutment of the adjusting piston on the valve needle.

DESCRIPTION OF THE PREFERRED EMBODIMENTS

Turning now to the drawing, FIGS. 1 and 2 each show a longitudinal cross sectional view through a fuel injection nozzle according to the invention, which comprises a nozzle body 1, in which a valve needle 2 is axially movable, and thereby arranged to control the fuel injection openings 3. The valve needle 2 is loaded by a closing spring 4, and defines together with the nozzle body 1 a pressure chamber 5. The closing spring 4 is arranged in a spring chamber 7, which is provided in a nozzle holder 6, and adapted to act on the valve needle 2 by means of a spring supporting flanged plate 8. An intermediate plate 9 is arranged between the nozzle body 1 and the nozzle holder 6. Furthermore, an axially movable adjusting piston 10 is provided in the nozzle holder 6, on one side of which there is an elongated stop means 11 that cooperates with the flanged plate 8, and can be acted upon on the other frontal side 12 by the pressurized fuel, which is also fed from the pressure connection 14 through a channel 13 in the nozzle body to the pressure chamber 5 of the injection nozzle and a channel 15 leads from the channel 13 to the frontal side 12 of the adjusting piston 10. The spring chamber 7 is relieved of pressure by means of a return channel 16.

In the first exemplary embodiment of the invention shown in FIG. 1, the valve needle has a sealing cone 17, which cooperates with a valve seat 18, that is arranged on the nozzle body 1. Furthermore, a control pin 19 is arranged on the valve needle 2, which pin 19 is axially guided and radially sealed, in a blind bore 20. The pin 19 and the blind bore 20 define a second pressure chamber 21. The injection openings 3 begin in the cylindrical section of the wall of the blind bore 20, which injection openings 3 are covered by the pin 19 when the valve needle is closed and are opened thereby during the opening stroke of the valve needle 2. Downstream of the sealing cone 17, a channel 22 is arranged in the pin 19, which channel 22 opens into the pressure chamber 21.

An amount of play $h_1$ is provided between the valve needle 2 or its spring supporting flanged plate 8, and the stop mandrel 11 of the adjusting piston 10. The adjusting piston 10 itself has a possible stroke of $h_2$, so that the entire stroke of the valve needle 2 is the sum of $h_1$ and $h_2 = h_3$. After completion of the stroke $h_3$, all injection openings 3 must be opened.

The fuel injection nozzle shown in FIG. 1 operates in the following manner.

As soon as the pressurized fuel, which is delivered from the fuel injection pump, not shown, arrives in the pressure chamber 5, and there is sufficient pressure, the valve needle 2 is lifted from its seat 18, because the pressurized fuel exerts an upward force on the surface 34. As a result the fuel can flow out of the pressure chamber 5 and into the pressure chamber 21. In this manner the surface that is acting in the opening direction is suddenly enlarged, that is the surface defining the cone 17 and the surface 36 are also acted upon by the pressurized fuel, so that the valve needle 2 is pushed against the stop means 11. Simultaneously either the lowermost fuel injection opening 3 or an injection opening at a higher level is opened. This first opening corresponds to the idling position. Meanwhile the adjusting piston 10 temporarily blocks the stroke movement of the valve needle 2 because the total downward force exerted by the spring 4 and the pressure of the pressurized fuel against the surface 12 is larger that the upwardly acting force. Because the diameter of the piston 10 is smaller than that of the valve needle 2, depending on the delivery rate when a higher pressure is attained, its resistance is overcome, that is the upward force on surfaces 34 and 36 and the surface defining the cone 17 exceeds the downward force exerted by the spring 4 and the pressure against the surface 12 and the valve needle 2 is pushed farther, thus opening additional injection openings, until at the completion of the strike $h_2$, that is, the entire stroke of the valve needle $h_3$, all of the injection openings are opened. After completion of the fuel delivery, the valve needle 2 is pushed by the closing spring 4 back into its original position, so that the pin 19 then once again covers the fuel injection openings 3.

In the exemplary embodiment of the invention shown in FIG. 2, the nozzle body 1' is modified in comparison to the nozzle body 1. The valve seat 24 is arranged in close proximity to the end of a cylindrical section 25 of a blind bore 26, into which the valve needle 2' projects. By means of the valve seat 24, the cylindrical section 25 of the blind bore 26 is separated from a pressure chamber 27, which is located in the blind bore 26. The valve needle has a slider-like section 28, which is radially sealed and axially guided in the cylindrical section 25 of the blind bore 26, and is defined on the bottom by a sealing cone 29, which is complemental to the valve seat 24. The injection openings 3' are provided in the cylindrical section 25, and can be opened successively during the stroke of the valve needle 2' by the slider-like section 28. The lowermost injection openings 3' are disposed in the transitional area between the cylindrical section 25 and the valve seat 24. The pressure chamber 5' is directly connected with the pressure chamber 27 by means of a channel 30, which extends through the valve needle 2', as shown.

In this shown second exemplary embodiment, the stop means 11 of the adjusting piston 10 is in constant contact with the spring supporting flanged plate 8 and thereby with the valve needle 2'. The entire stroke $h_3$ of the valve needle 2' is determined by a shoulder 32 of the intermediate plate 9'.

The second exemplary embodiment operates in the following manner.

As soon as the delivered fuel travels through the channel 13 and into the pressure chamber 5', it flows directly through the channel 30 into the pressure chamber 27 and acts upon the lower frontal surface 38 of the valve needle 2'. When the pressure is sufficient, the valve needle is lifted from the seat 24, due to the pressure force against surfaces 34' and 38 and opens the first injection openings 3'. Because the adjusting piston 10 acts directly on the valve needle 2', depending on the delivery performance, the valve needle 2' is gradually pushed upward without a sudden pressure increase, because of the added upward force produced by the pressurized fuel against conical surface 29 thus successively thereafter, opening the other injection openings 3'. In this embodiment, too, the injection openings 3' are covered by the slider-like section 28 of the valve needle 2 after completion of the injection.

By the use of the adjusting piston 10, first of all the force of the closing spring 4 can be greatly decreased. It must only be sufficient to avoid an opening of the nozzles during the injection periods by the pulsing of fuel in the lines. Because the injection openings 3' are directly covered in a slide-like manner, pressures from the combustion chamber cannot have an effect thereon when the valve needle 2' is closed. Of course, the diameter of the adjusting piston 10 and the valve needle 2' or its shoulders, which are effective at the beginning, and the spring force must be selected to correspond with the expected delivery pressure of the fuel. Thus, it is conceivable that a fuel injection nozzle according to the invention could have the pin control of the first exemplary embodiment, and the constant adjusting piston effect of the second exemplary embodiment. The reverse is, of course, also conceivable, that an embodiment of the invention could have the slide control of the second exemplary embodiment combined with the preliminary play of the adjusting piston 10 of the first exemplary embodiment.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. In a fuel injection nozzle through which pressurized fuel is delivered to an internal combustion engine, the nozzle including: a nozzle body in which a bore is defined leading to a plurality of injection openings through which the fuel is injected; a valve needle having at least one end thereof extending into said bore for controlling the opening extent of said injection openings; a closing spring mounted to engage the valve needle and exert a force against the valve needle to move said valve needle toward the injection openings; and an adjusting piston mounted in axial alignment with the valve needle, the adjusting piston being mounted to exert an additional force against the valve needle tending to move the valve needle toward the injection openings, the improvement wherein:

said nozzle body and said valve needle include complementally formed engaging surfaces capable of preventing fuel flow when said valve needle is depressurized;

said bore defined by said nozzle body includes a blind bore into which the injection openings open;

said valve needle includes a frontal portion that cooperates with said blind bore to define a first chamber, a cylindrical section at said at least one end thereof, radially sealable in said blind bore, channel means in said cylindrical section of said valve needle arranged to deliver fuel from a pressure chamber to said first chamber wherein said channel means are closed to fuel delivery when said complementally formed sealing surfaces are in engagement, and at least a pair of pressure receiving surfaces displaced axially relative to each other along the valve needle, such that the pressure exerted against the pressure receiving surfaces when said pressure receiving surfaces are exposed to the pressurized fuel results in a force on each surface tending to move the valve needle away from the injection openings against the spring force and said additional force;

said valve needle having a two-stage opening stroke, whereby a portion of the injection openings are opened by the radially sealed cylindrical section of said valve needle for fuel passage therethrough as a result of the fuel pressure acting against at least one of said pair of pressure receiving surfaces, and the remainder of the injection openings are opened by the radially sealed cylindrical section of said valve needle for fuel passage therethrough as a result of the force acting against all of the pressure receiving surfaces.

2. A fuel injection nozzle according to claim 1, wherein said cylindrical section includes a conical surface and the frontal side of said valve needle cooperates with a conical valve seat on said nozzle body.

3. A fuel injection nozzle according to claim 1, wherein said adjusting piston includes a stop means arranged to cooperate with said valve needle and control its upward movement.

4. A fuel injection nozzle according to claim 1, wherein said valve needle contacts said adjusting piston when the force acting against said at least one of the pair of pressure receiving surfaces is attained.

* * * * *